(No Model.)

J. H. GOODFELLOW.
STOVE PIPE DAMPER.

No. 249,516. Patented Nov. 15, 1881.

WITNESSES:
Isaac P. Turner
James T. Goodfellow

INVENTOR:
John H. Goodfellow

UNITED STATES PATENT OFFICE.

JOHN H. GOODFELLOW, OF TROY, NEW YORK, ASSIGNOR TO WILLIAM F. GREENE, OF SAME PLACE.

STOVE-PIPE DAMPER.

SPECIFICATION forming part of Letters Patent No. 249,516, dated November 15, 1881.

Application filed July 11, 1881. (No model.)

*To all whom it may concern:*

Be it known that I, JOHN H. GOODFELLOW, of the city of Troy, in the county of Rensselaer and State of New York, have invented certain new and useful Improvements in Stove-Pipe Dampers, described in the following specification, reference being had to the accompanying drawings, in which—

Figure 1:
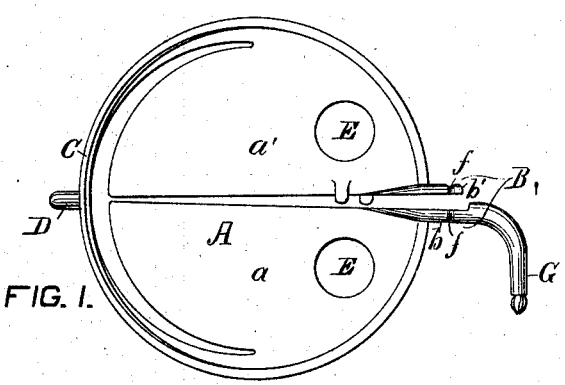
Figure 2:
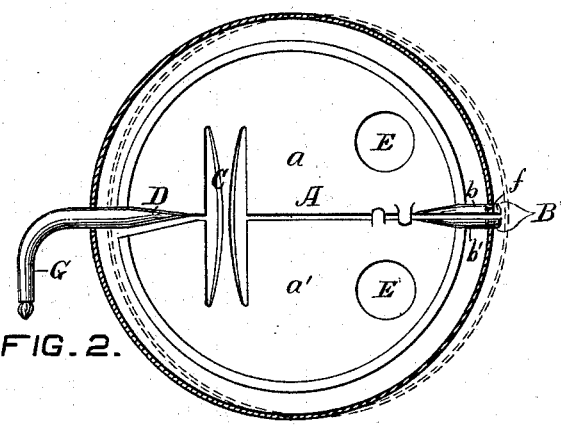

Figure 1 is a plan view of my invention. Fig. 2 is a plan view of a modified form of my invention as shown in place in a section of pipe; and Fig. 3 is a plan view of another modified form of my invention.

My invention relates to that class of dampers that are usually made in the form of a disk and are supported in their places in stove-pipes by means of two radially-projecting journals upon diametrically-opposite sides of such dampers; and the principal objects that I have in my invention are the production of sufficient yielding friction of the sides of one of the supporting-journals of such a damper against the edge of the hole in the pipe provided therefor, to retain such damper in any position at which it may be set in regulating the draft thereby through the pipe, simplicity of construction, and cheapness of manufacture.

In the various figures, in which like characters refer to similar parts, A is the disk-like body of the damper, and B a journal of the damper, composed of two parts, $b$ and $b'$, so arranged with reference to each other as to be spread apart and press against the edge of the pipe about such journal, when in place therein, by means of a spring, C, firmly connected with the body A of the damper.

Figure 3:
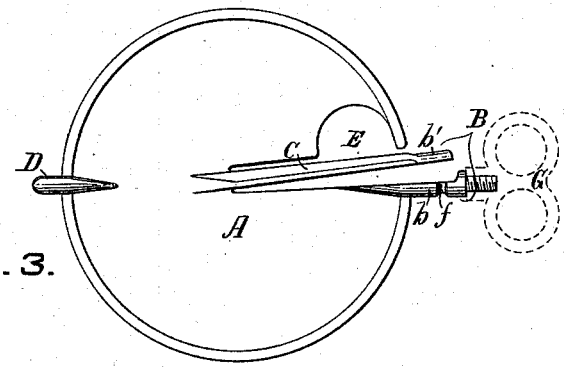

In Fig. 3 one part of the journal B is on the body A of the damper, and the other part of such journal is on the free end of the spring C. In Figs. 1 and 2 the body A of the damper is shown as divided in two parts, $a$ and $a'$, in the same plane with each other, and each of which parts $a$ $a'$ has a part of the divided journal B thereon; and the parts $b$ $b'$ of such journal are forced apart by means of a spring, C, firmly connected to the parts $a$ $a'$ of the damper-disk.

Although the spring C, arranged substantially as shown in the damper for the purpose stated, may be made of any suitable material and cast in or otherwise connected with the body of the damper, I preferably cast the body A, spring C, and the journals B D of the same material and in one piece, with a view to simplicity of construction and cheapness of production.

By first inserting the longer of the journals B D of the damper, constructed as shown, in its bearing, the shorter of such journals can be brought to a position for entering its bearing, as indicated in Fig. 2, without necessarily springing or altering the shape of the pipe therefor.

I provide the hole or holes E in the body A of the damper, for the purpose of inserting the finger of the hand, for convenience in overcoming the action of the spring C in forcing the parts $b$ $b'$ together, as when inserting the journal B in its bearing in the pipe.

In order to retain the journals B and D in their places in the stove-pipe, I provide the journal B with a notch or annular crease, $f$, therein, to engage with the edge of the pipe forming the bearing for such journal.

The shank or handle G, for turning the damper on its journals B D, may be made in one piece, or otherwise connected with either of such journals, as may be desired.

What I claim as of my invention is—

1. In a damper, the journal B, composed of parts $b$ $b'$, and the spring C, combined substantially as shown and described.

2. In a damper, the body A, formed in two parts, $a$ $a'$, each part having a part of the divided journal B thereon, and a spring, C, connecting the parts $a$ $a'$, all combined and to operate substantially as shown and specified.

3. In a damper, the body A, two-part journal B, spring C for separating the parts $b$ $b'$ of such journal, and the finger-hole E, all combined and arranged substantially as shown and set forth.

4. In a damper, the journal B, composed of parts $b$ $b'$, provided with the notch or crease $f$ therein, and spring C, all combined to operate substantially as shown and specified.

In witness whereof I hereunto set my hand, in the presence of two subscribing witnesses, this 9th day of July, 1881.

JOHN H. GOODFELLOW.

Witnesses:
GEO. S. DEXTER,
GEO. P. LAWTON.